US007114906B1

(12) United States Patent
Baumgarner et al.

(10) Patent No.: US 7,114,906 B1
(45) Date of Patent: Oct. 3, 2006

(54) HYDRAULIC PALLET JACK

(76) Inventors: Chuck Baumgarner, 5306 W. LaSalle St, Laveen, AZ (US) 85339; Tracey Baumgarner, 5306 W. LaSalle St., Laveen, AZ (US) 85339

( * ) Notice: Subject to any disclaimer, the term of this patent is extended or adjusted under 35 U.S.C. 154(b) by 202 days.

(21) Appl. No.: 10/973,321

(22) Filed: Oct. 27, 2004

(51) Int. Cl.
*B60P 9/00* (2006.01)

(52) U.S. Cl. .................................... 414/495; 280/43.12

(58) Field of Classification Search ................ 414/495, 414/592, 785, 607; 280/43.12, 480
See application file for complete search history.

(56) References Cited

U.S. PATENT DOCUMENTS 4,027,771 A * 6/1977 Adams ....................... 414/495
4,240,358 A 12/1980 Munroe
4,287,959 A * 9/1981 Inman ......................... 180/12
4,408,544 A 10/1983 Haataja
4,550,940 A 11/1985 Schweikert
4,589,669 A * 5/1986 Kedem .................... 280/43.12
4,625,424 A 12/1986 de la Haye
4,834,409 A * 5/1989 Kramer ...................... 180/209
4,950,126 A 8/1990 Fabiano et al.
4,969,794 A * 11/1990 Larsen ....................... 414/495
D356,413 S 3/1995 Tsai

* cited by examiner

*Primary Examiner*—Eileen D. Lillis
*Assistant Examiner*—Charles A. Fox
(74) *Attorney, Agent, or Firm*—Donald R. Schoonover

(57) ABSTRACT

A pallet jack includes a hydraulic system that allows for adjustment of the pallet-engaging portion of the jack using a mechanical adjusting system whereby a large variety of pallet sizes can be accommodated. Once the desired width is achieved, the hydraulic system is used to raise the pallet engaging portion of the pallet jack once the pallet is engaged.

1 Claim, 7 Drawing Sheets

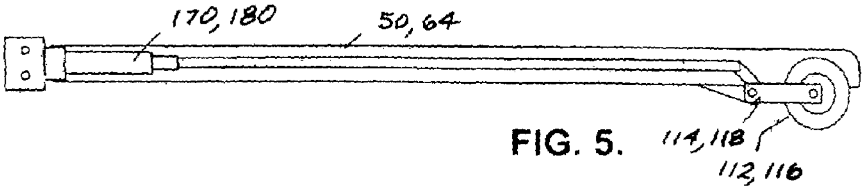
FIG. 5.
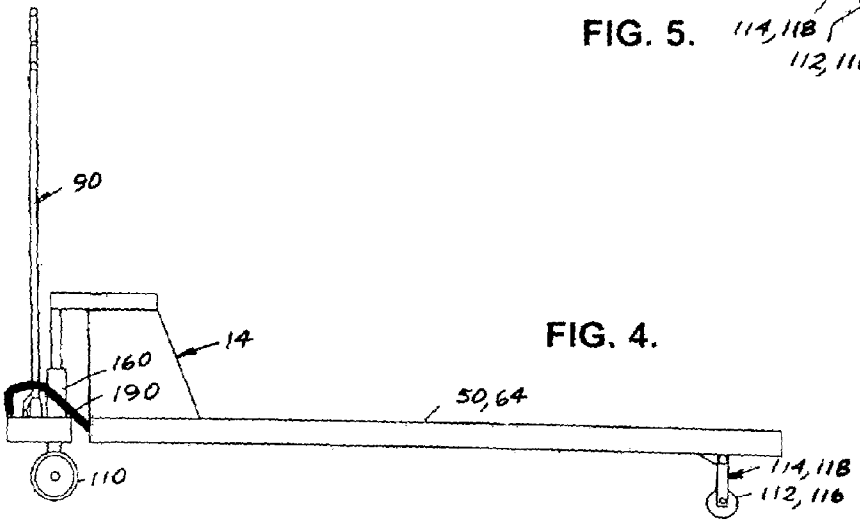
FIG. 4.
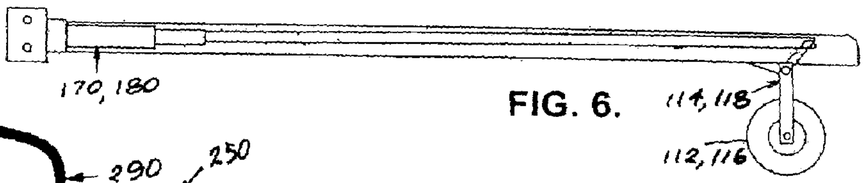
FIG. 6.
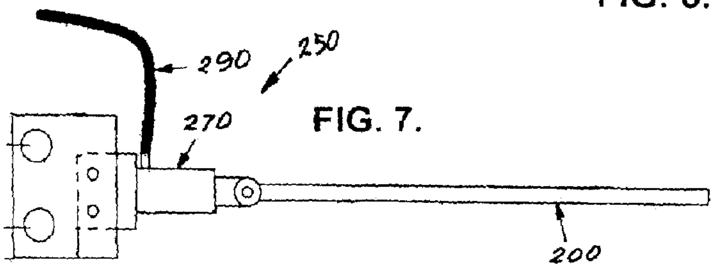
FIG. 7.
FIG. 8.
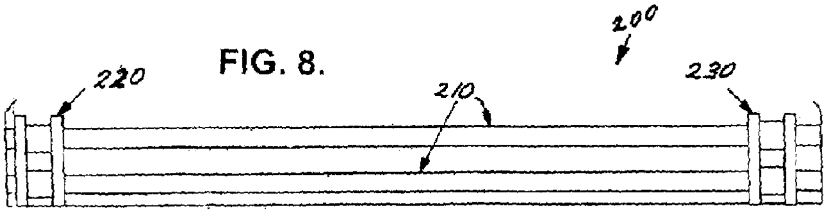

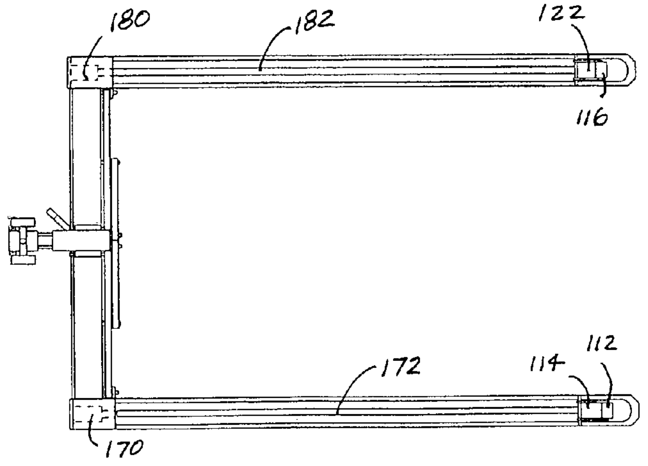
FIG. 13.
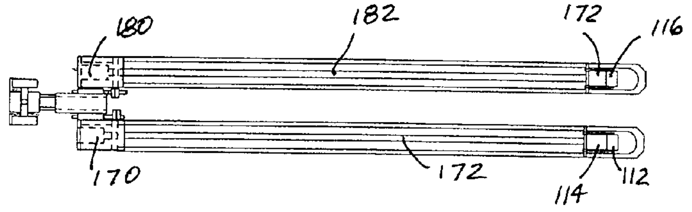
FIG. 14.
FIG. 15.
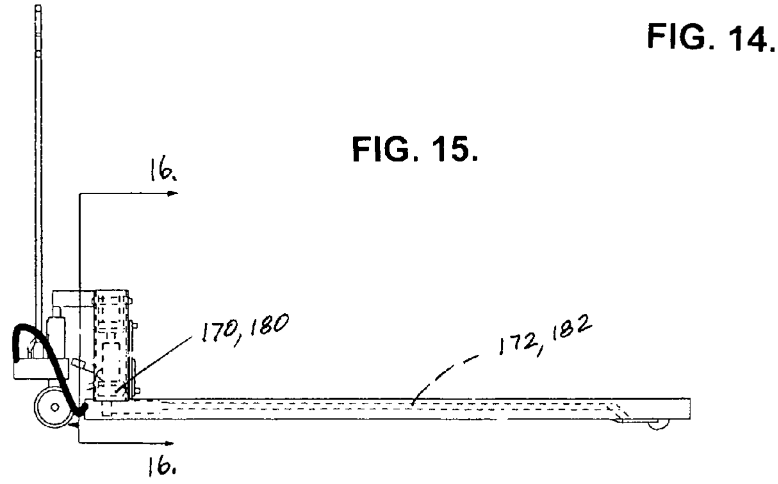

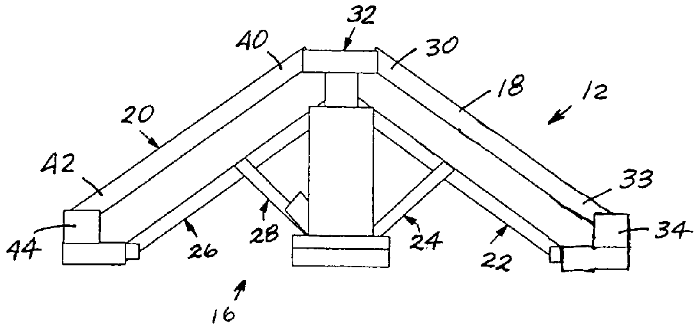
FIG. 16.
FIG. 17.
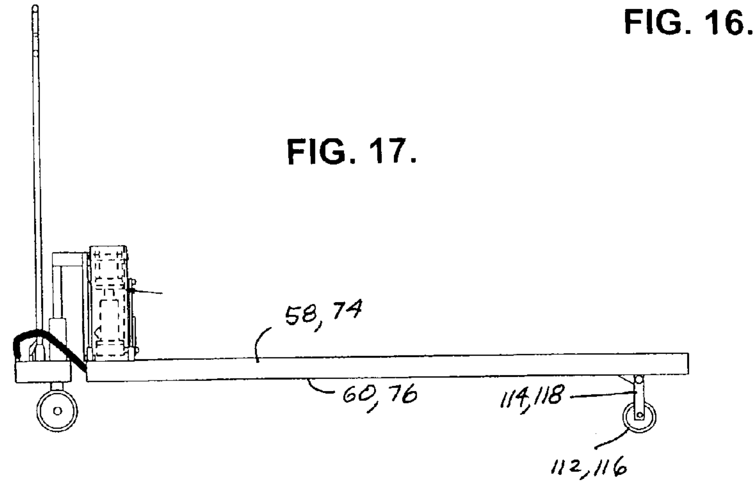
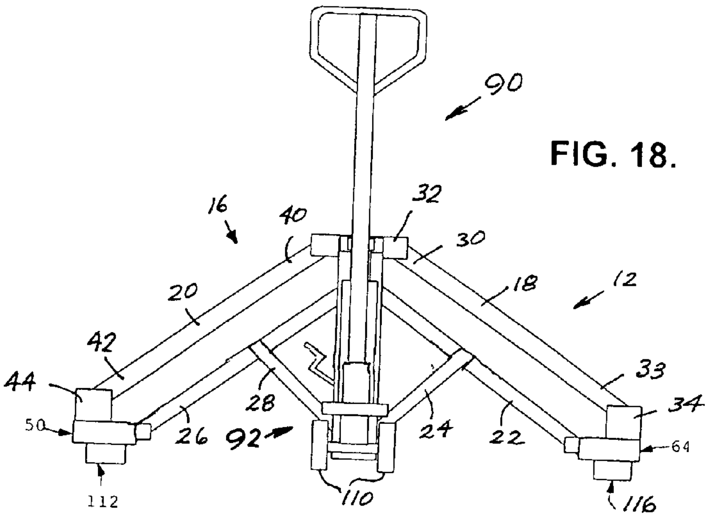
FIG. 18.

HYDRAULIC PALLET JACK

BACKGROUND OF THE INVENTION

1. Field of the Invention

The present invention relates to the general art of land vehicles, and to the particular field of pallet jack type land vehicles.

2. Description of the Related Art

Many people must move heavy pallets from one place to another. Truckers must load and unload heavy pallets, personnel in warehouse must move heavy pallets, and the like. Often, a heavy pallet must be loaded onto a pallet jack to be moved. One problem encountered in the use of a pallet jack is the size of the pallet and the size of the jack may be incompatible. That is, the pallet may be too large for the jack or vice versa. In such instances, the jack may be nearly useless, or it may take considerable time to adjust the size of the jack to accommodate the pallet. In either instance, time and/or money is lost.

Therefore, there is a need for a pallet jack that can be easily and quickly adjusted to accommodate a pallet.

In some cases, the pallet is quite heavy and is not easily moved, even to permit a pallet jack to accommodate the pallet. If a pallet is too heavy, it may not be possible for a pallet jack to be modified to accommodate the pallet.

Therefore, there is a need for a pallet jack that can be easily and quickly adjusted to accommodate a pallet, even a very heavy pallet.

In some cases, a pallet and a pallet jack are incompatible in two dimensions. That is, the pallet may be too long and too wide for the pallet jack, or vice versa. In such instances, a pallet jack may not be useable at all.

Therefore, there is a need for a pallet jack that can be easily and quickly adjusted in more than one dimension to accommodate a pallet. More specifically, there is a need for a pallet jack that can be easily and quickly adjusted in a widthwise direction of the pallet jack to accommodate pallets having a variety of width dimensions.

PRINCIPAL OBJECTS OF THE INVENTION

It is a main object of the present invention to provide a pallet jack that can be easily and quickly adjusted to accommodate a pallet.

It is another object of the present invention to provide a pallet jack that can be easily and quickly adjusted to accommodate a pallet, even a very heavy pallet.

It is another object of the present invention to provide a pallet jack that can be easily and quickly adjusted.

It is a specific object of the present invention to provide a pallet jack that can be easily and quickly adjusted in a widthwise direction of the pallet jack to accommodate pallets having a variety of width dimensions.

SUMMARY OF THE INVENTION

These, and other, objects are achieved by a pallet jack that includes a hydraulic system that permits adjustment of the width of the pallet jack whereby the size of the pallet jack can be adjusted to accommodate a wide range of pallet sizes. The pallet jack embodying the present invention can be adjusted in the widthwise direction of the pallet jack so pallets having a variety of widths can be accommodated by the pallet jack. The hydraulic system of the pallet jack embodying the present invention is also used to raise the jack after the jack has been positioned beneath a pallet so the pallet can be easily moved by the jack.

Using the pallet jack embodying the present invention will permit an operator to quickly, easily and accurately adjust the size of the pallet jack to accommodate a wide range of pallet sizes, especially a variety of widths.

BRIEF DESCRIPTION OF THE DRAWING FIGURES

FIG. 4 is a side elevational view of the pallet jack embodying the present invention with the wheels in a deployed position.

FIG. 5 shows a detail of the hydraulic ram used to move the wheels of the pallet jack between a retracted position and a deployed position with the wheels in a retracted position.

FIG. 6 shows a detail of the hydraulic ram used to move the wheels of the pallet jack between a retracted position and a deployed position with the wheels in a deployed position.

FIG. 7 is a view of the hydraulic ram used to move the wheels of the pallet jack.

FIG. 8 is a view taken along line 8—8 of FIG. 3 and shows the system used to move the forks of the pallet jack in a width direction.

FIG. 13 is a bottom plan view showing the first and second pallet-engaging fork elements extended outwardly.

FIG. 14 is a bottom plan view showing the first and second pallet-engaging fork elements retracted inwardly.

FIG. 15 is a side elevational view showing wheels retracted upwardly.

FIG. 16 is an elevational view taken along line 16—16 of FIG. 15.

FIG. 17 is a side elevational view showing the wheels extended downwardly.

FIG. 18 is an elevational view opposing the view shown in FIG. 10.

DETAILED DESCRIPTION OF THE PREFERRED EMBODIMENT

Figure 2:
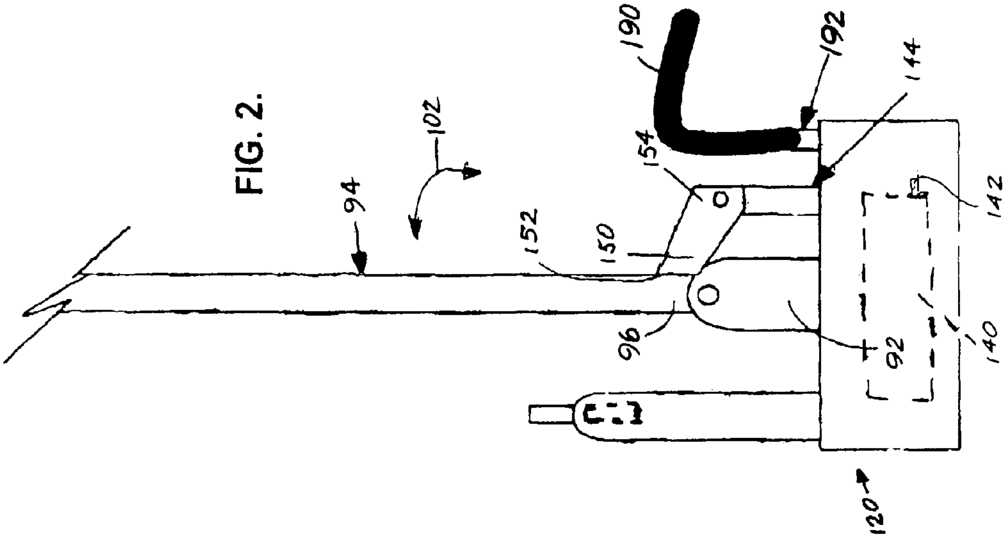
FIG. 2 shows a portion of a hydraulic unit used in the pallet jack shown in FIG. 1.

Other objects, features and advantages of the invention will become apparent from a consideration of the following detailed description and the accompanying drawings.

Referring to FIGS. 1 through 19, it can be understood that the present invention is embodied in a pallet jack 10. Pallet jack 10 can be adjusted in width dimension as well as in height dimension so pallets of a wide variety of sizes can be accommodated on the pallet jack.

Pallet jack 10 comprises a frame unit 12 including a housing 14, an adjustment mechanism 16 having six components: a first component 18, a second component 20, a third component 22, a fourth component 24, a fifth component 26, and a sixth component 28. First component 18 includes a first end 30, which is attached to adjustment jack bracket 32, and a second end 33, which is attached to mounting bracket 34 which is attached to first fork element 36. Second component 20 has a first end 40, which is attached to adjustment jack bracket 32, and a second end 42, which is attached to mounting bracket 44, which is attached to second fork element 46.

Figure 1:
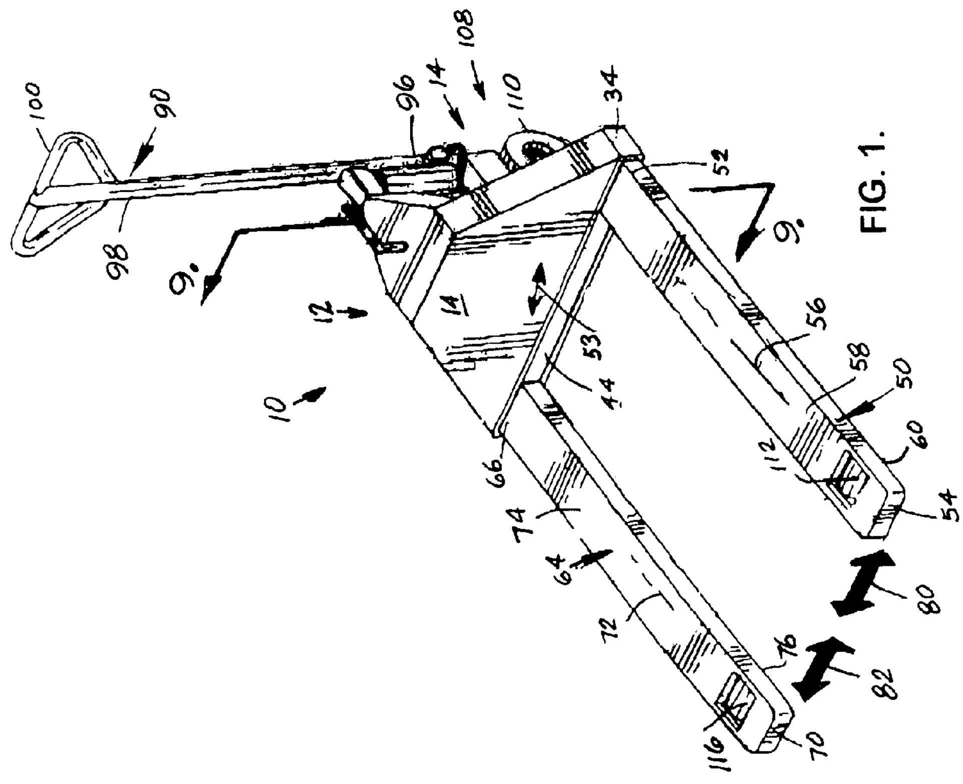
FIG. 1 is a perspective view of a pallet jack embodying the present invention.
Figure 9:
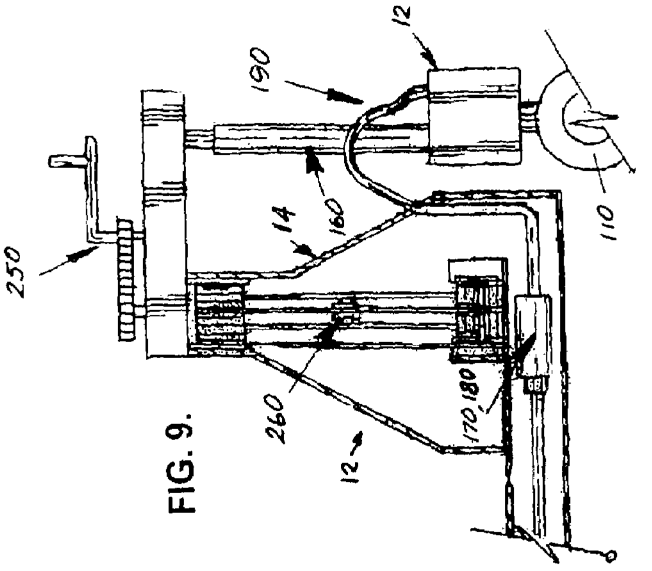
FIG. 9 shows a system that can be used to move the pallet-engaging forks in a width direction and is a view taken along line 9—9 of FIG. 1.
Figure 12:
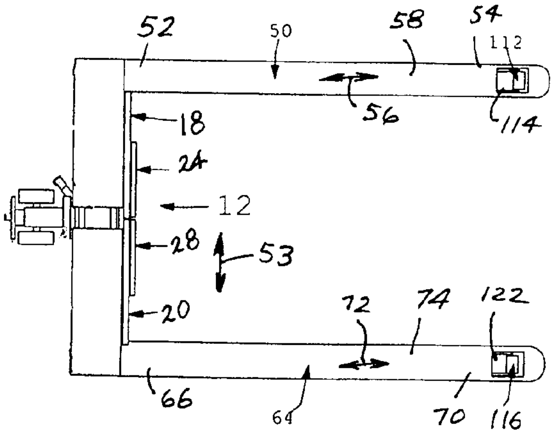
FIG. 12 is a top plan view showing the first and second pallet-engaging fork elements extended outwardly.

First fork element 36 includes a first pallet-engaging fork element 50 with a proximal end 52 movably attached to components 18 and 22 wherein the first pallet-engaging fork element 50 and is movable between a first position shown in FIGS. 1, 5 and 12 spaced outwardly in the direction of a width dimension 53 of the adjustment mechanism 16, and a second position indicated in FIGS. 2 and 4 spaced inwardly in the direction of the width dimension 53 of the adjustment mechanism 16. First pallet-engaging fork element 50 further includes a distal end 54 which is spaced apart from the housing 14 and a length dimension 56 which extends between the proximal end 52 of the first pallet-engaging fork element 50 and the distal end 54 of the first pallet-engaging fork element 50. First fork element 36 further includes a first surface 58, which is a top surface when the first pallet-engaging fork element 50 is in a use position, and a second surface 60, which is a bottom surface when the first pallet-engaging fork element 50 is in the use position.

Figure 10:
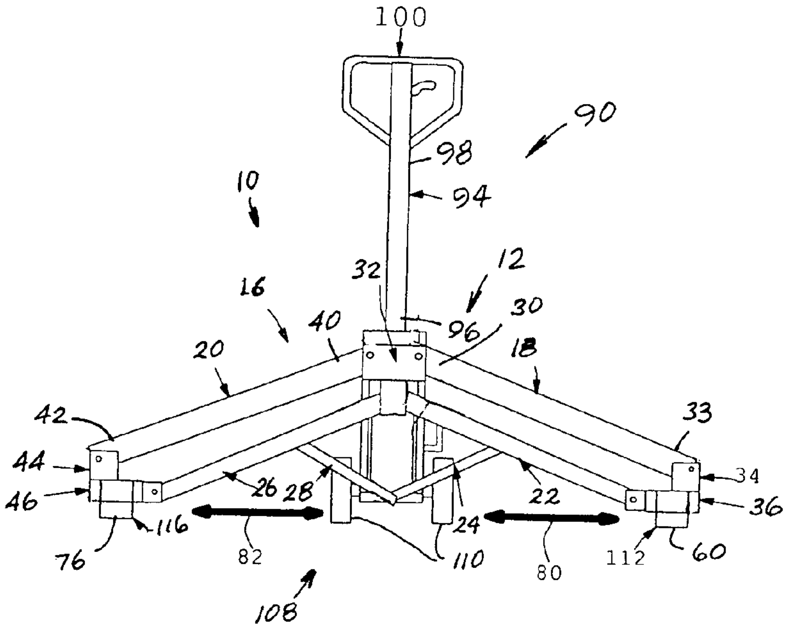
FIG. 10 is an elevational view from distal ends of first and second pallet-engaging fork elements, showing the first and second pallet-engaging fork elements extended outwardly.
Figure 11:
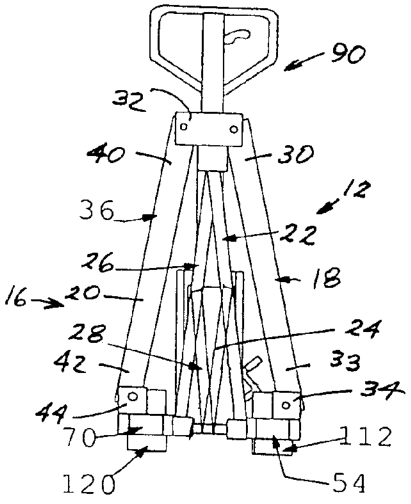
FIG. 11 is an elevational view from distal ends of the first and second pallet-engaging fork elements, showing the first and second pallet-engaging fork elements retracted inwardly.

Second fork element 46 includes a second pallet-engaging fork element 64 with a proximal end 66 movably attached to components 20 and 26 wherein the second pallet-engaging fork element 64 is movable between a first position, shown in FIGS. 1, 10, 12, ,13, 16 and 18, spaced outwardly in the direction of the width dimension 53 of the adjustment mechanism 16, and a second position, shown in FIGS. 11 and 14, spaced inwardly in the direction of the width dimension 53 of the adjustment mechanism 16. Second pallet-engaging fork element 64 further includes a distal end 70, which is spaced apart from the housing 14, and a length dimension 72, which extends between the proximal end 66 of the second pallet-engaging fork element 64 and the distal end 70 of the second pallet-engaging fork element 64. Second fork element 64 further includes a first surface 74, which is a top surface when the second pallet-engaging fork element 64 is in a use position, and a second surface 76, which is a bottom surface when the second pallet-engaging fork element 64 is in the use position.

Widthwise movement of the pallet-engaging fork elements 50, 64 is indicated in FIGS. 1 and 10 by double-headed arrows 80 and 82.

Figure 3:
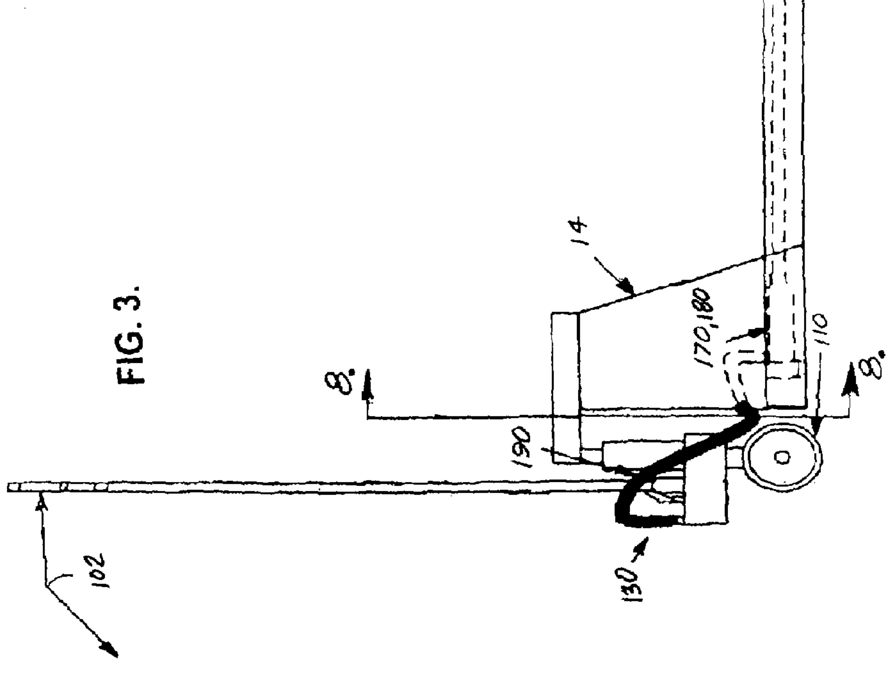
FIG. 3 is a side elevational view of the pallet jack embodying the present invention with the wheels in a retracted position.

A handle unit 90 includes a pivot mount 92 mounted on the frame unit 12 and a handle element 94 which has a proximal end 96 pivotally attached to the pivot mount 92, a distal end 98, and a hand grip element 100 mounted on the distal end 98 of the handle unit 90. As indicated in FIGS. 2, 3 and 19 by double-headed arrow 102, the handle unit 90 is pivotally movable between a first position, which is upright when the handle unit 90 is in a first condition, and a second position, wherein the handle element 94 is at an oblique angle with respect to the first position when the handle unit 90 is in a second condition.

A wheel unit 108 is mounted on the frame unit 12 and includes a pair of wheels 110 mounted on the frame unit 12. A second wheel 112 is mounted on the first pallet-engaging fork element 50 near the distal end 54 of the first pallet-engaging fork element 50. A pivot arm 114 is connected to the second wheel 112. A third wheel 116 is mounted on the second pallet-engaging fork element 64 near the distal end 70 of the second pallet-engaging fork element 64. A pivot arm 118 is connected to the third wheel 116.

Figure 19:
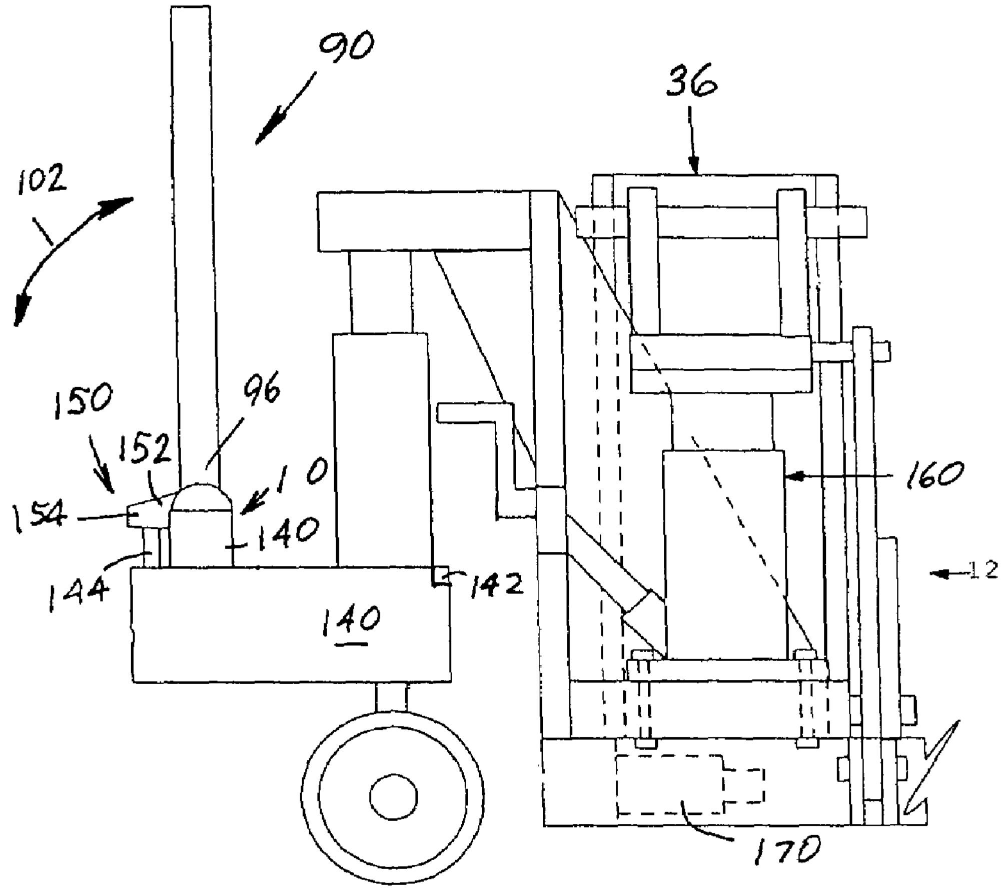
FIG. 19 is an enlarged and fragmentary, schematic representation of portions of the hydraulic system of the pallet jack of the present invention.

Pallet jack 10 further includes a hydraulic unit 120 as schematically shown in FIGS. 2 and 19. The hydraulic unit 130 includes a hydraulic fluid container 140 mounted on the frame unit 12. The hydraulic fluid container 140 includes a vent valve 142.

A pump element 144 is mounted on the frame unit 12 adjacent to the hydraulic fluid container 140 and is connected thereto.

A mechanical connecting arm 150 has a first end 152 connected to the handle unit 90 and a second end 154 connected to the pump element 144. The mechanical connecting arm 150 is pivotally connected to thereby translate movement of the handle unit 90 into pumping movement of the pump element 144.

A first hydraulic ram element 160 is fluidically connected to the hydraulic fluid container 140 and is movably mounted on the frame unit 12 to move between an extended position and a retracted position. The first hydraulic ram element 160 is connected to the pair of wheels 110 to move the pair of wheels 110 between a retracted position when the first hydraulic ram element 160 is in the retracted position and a deployed position when the first hydraulic ram element 160 is in the extended position.

A second hydraulic ram element 170 is fluidically connected to the hydraulic fluid container 140 and is movably mounted on the first pallet-engaging fork element 50 to move between an extended position and a retracted position. The second hydraulic ram element 170 is connected via a pushrod 172 to the pivot arm 114 of the second wheel 112 to move the second wheel 112 between a retracted position, as indicated in FIGS. 3, 5 and 15, when the second hydraulic ram element 170 is in the retracted position and a deployed position, as indicated in FIGS. 4, 6 and 17, when the second hydraulic ram element 170 is in the extended position.

Similarly, a third hydraulic ram element 180 is fluidically connected to the hydraulic fluid container 140 and is movably mounted on the second pallet-engaging fork element 64 to move between an extended position and a retracted position. The third hydraulic ram element 180 is connected via pushrod 182 to the pivot arm 122 of the third wheel 120 to move the third wheel 116 between a retracted position when the third hydraulic ram element 180 is in the retracted position and a deployed position when the third hydraulic ram element 180 is in the extended position.

Fluid hoses, such as fluid hose 190, and fluid connections, such as fluid connection 192, are used to effect the fluid connections in the hydraulic system included in pallet jack 10.

Pallet jack 10 further includes a pallet-engaging fork element-moving unit 200 mounted in the frame unit 12. Unit 200 includes support bars 210 mounted on the frame unit 12 and extending in the direction of the width dimension 53 of the adjustment mechanism 16, a first bracket 220 movably mounted on the support bars 210 and fastened to the first pallet-engaging fork element 50, a second bracket 230 movably mounted on the support bars 210 and fastened to the second pallet-engaging fork element 64, and a means 250 for moving the first bracket 220 and the second bracket 230 toward and away from each other in the direction of the width dimension 53 of the adjustment mechanism 16.

Means 250 may include mechanical elements such as a rack and pinion arrangement 260, or can be a hydraulic system 270 fluidically connected to the above-described hydraulic system by a fluid conduit 290.

It is understood that while certain forms of the present invention have been illustrated and described herein, it is not to be limited to the specific forms or arrangements of parts described and shown.

What is needed and desired to be covered by Letters Patent is as follows:

1. A pallet jack comprising:

(a) a frame unit which includes (1) a housing, (2) a pallet-engaging section having (A) mechanisms which convert upward movement of a mechanical jack into a widthwise motion and which cause fork elements to move inward and outward and to also keep the fork elements in a level position during movement and to stabilize the fork elements when a desired width is achieved and to deploy the pallet-engaging section, (B) a first pallet-engaging fork element having a proximal end movably attached to a first adjustment element and movable between an outwardly extended first position of the first pallet engaging fork element, and a retracted second position spaced inwardly from the first position of the first pallet-engaging fork element, a distal end which is spaced apart from the first adjustment element, a length dimension which extends between the proximal end of the first pallet-engaging fork element and the distal end of the first pallet-engaging fork element, a first surface which is a top surface, and a second surface which is a bottom surface, (C) a second pallet-engaging fork element having a proximal end movably attached to a second adjustment element and is movable between an outwardly extended first position of the second pallet-engaging fork element and a retracted second position spaced inwardly from the first position of the second pallet-engaging fork element, a distal end which is spaced apart from the second adjustment element, a length dimension which extends between the proximal end of the second pallet-engaging fork element and the distal end of the second pallet-engaging fork element, a first surface which is a top surface, and a second surface which is a bottom surface, and (3) a handle unit mounted on said frame unit and having (A) a pivot mount on said frame unit, and (B) a handle element having a proximal end pivotally attached to the pivot mount, a distal end and a hand grip element mounted on the distal end of the handle element, the handle element being pivotally movable between a first position which is upright when the handle unit is in a first condition and a second position which is at an oblique angle with respect to the first position when the handle unit is in a second condition;

(b) a wheel unit mounted on said frame unit and having (1) a first set of wheels mounted on the frame unit, (2) a second wheel mounted on the first pallet-engaging fork element near the distal end of the first pallet-engaging fork element and including a pivot arm, and (3) a third wheel mounted on the second pallet-engaging fork element near the distal end of the second pallet-engaging fork element and including a pivot arm;

(c) a hydraulic unit which includes (1) a hydraulic fluid container mounted on the frame unit, the hydraulic fluid container including a vent valve, (2) a pump element mounted on the frame unit adjacent to the hydraulic fluid container and connected thereto, (3) a mechanical connecting arm which has a first end connected to the handle element and a second end connected to the pump element, the mechanical connecting arm being pivotally mounted on the frame unit to translate movement of the handle element into pumping movement of the pump element, (4) a first hydraulic ram element fluidically connected to the hydraulic fluid container and movably mounted on the frame unit to move between an extended position and a retracted position, the first hydraulic ram element being connected to the first set of wheels to move the first set of wheels between a retracted position when the first hydraulic ram is in the retracted position and a deployed position when the first hydraulic ram is in the extended position, (5) a second hydraulic ram element fluidically connected to the hydraulic fluid container and movably mounted on the frame unit to move between an extended position and a retracted position, the second hydraulic ram element being connected via a pushrod to the pivot arm of the second wheel to move the second wheel between a retracted position when the second hydraulic ram is in the retracted position and a deployed position when the second hydraulic ram is in the extended position, and (6) a third hydraulic ram element fluidically connected to the hydraulic fluid container and movably mounted on the frame unit to move between an extended position and a retracted position, the third hydraulic ram element being connected via a pushrod to the pivot arm of the third wheel to move the third wheel between a retracted position when the third hydraulic ram is in the retracted position and a deployed position when the third hydraulic ram is in the extended position; and (d) a pallet-engaging fork element-moving unit mounted in the adjustment mechanism and including (1) a plurality of adjustment mechanism elements extending in the direction of the range of motion of the adjustment mechanism, (2) a first bracket movably mounted on the adjustment mechanisms and fastened to the first pallet-engaging fork element, (3) a second bracket movably mounted on the adjustment mechanisms and fastened to the second pallet-engaging fork element, and (4) a means for moving the first bracket and the second brackets toward and away from each other in the range of motion of the first adjustment mechanism.

* * * * *